Sept. 4, 1928.  1,683,498
I. SANTOS Y SUAREZ ET AL
TRACK LAYING DEVICE
Filed May 26, 1927
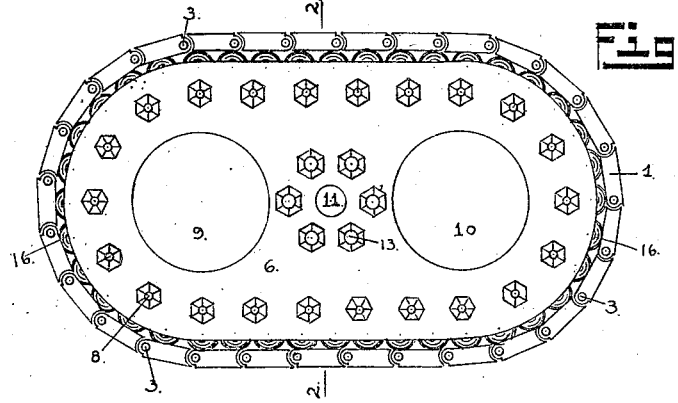
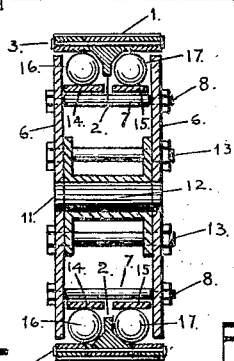
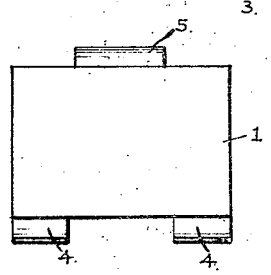
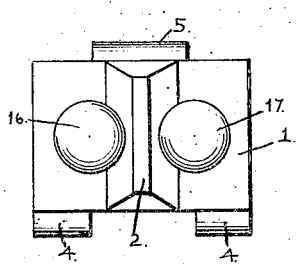
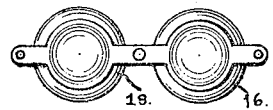
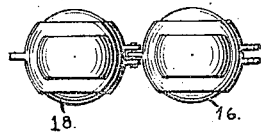
Isaac Santos y Suarez
Angel Acosta y Velo, Inventors
By Geo. P. Kimmel, atty.

Patented Sept. 4, 1928.

1,683,498

UNITED STATES PATENT OFFICE.

ISAAC SANTOS y SUAREZ AND ANGEL ACOSTA y VELO, OF HABANA, CUBA.

TRACK-LAYING DEVICE.

Application filed May 26, 1927. Serial No. 194,410.

This invention relates to rural transport means, where use is made at present of known devices of old types, which are difficult to operate and move, particularly so in rainy seasons, and over soft and rough ground.

One advantage of the invention lays in providing means to support and move heavy loads, whatever may be the condition of the ground.

Another advantage is its construction which results in a saving of power in operating it.

Another advantage is that it does not require the attention of a skilled operator, and that repairs are easily made, due to the simplicity of construction and the small number of elements of which it is composed.

Another advantage is the elimination of injurious traction, and reduction of lubrication costs with the avoidance of over-heating at any speed, so that the life thereof is practically unlimited.

A further advantage over wheels at present in use, is its quietness of operation, preventing disturbing oxen, when running and their failure to hear the commands of the driver.

The above and other advantages are set forth clearly hereinafter, and illustrated in the accompanying drawing, in which like reference characters denote like parts thereof in the several views, and wherein;

Fig. 1 is a side elevation of the improved device.

Fig. 2 is a vertical section on line 2—2 of Fig. 1.

Figure 3 is an elevation, looking towards the outer face of one of the links of the track laying element.

Figure 4 is a view similar to Figure 3 looking towards the inner face of the link and further illustrating a pair of bearing balls positioned relative to such face.

Fig. 5 is a side view of the cage holding the balls equidistantly spaced.

Fig. 6 is a top view of the mechanism shown in Fig. 5.

Referring to the drawings, the device includes a track-laying element formed of a series of links 1 which are articulated together. The track-laying element is endless. The outer face of each link 1 is flat and its inner face is formed with a transversely extending web or rib 2 to provide spacing means for sets of bearing balls to be presently referred to. The web or rib 2 is substantially Y-shape in cross section and with the broadest portion thereof integral with the inner face of the link 1. Each link 1 is of rectangular contour and has one side formed with a pair of opposed spaced apertured wings or barrels 4. The other side of the link, centrally thereof is provided with an apertured wing or barrel 5. The wing 5 of one link is positioned between a pair of barrels 4 of an adjacent link and the wings 5 are connected to the wings 4 by bolts 3 whereby the links are articulated or hinged together.

The device further includes a pair of opposed, spaced side plates of like construction and preferably of elliptical contour. The plates 6 are maintained in parallel spaced relation by separators or spacers 7 and holdfast devices 8 in the form of bolts and nuts.

The plates 6 are provided with apertures 9, 10 and 11, aperture 11 being concentric with respect to bushing 12 which is secured to said plates 6 by means of holdfast devices 13.

Mounted on the separators 8 is a pair of opposed endless strips or straps 14, 15, which provide ball races. Positioned around the strip 14 and bearing thereagainst is a set of spaced bearing balls 16 and positioned around and bearing against the strip 15 is a set of spaced bearing balls 17. The bearing balls project beyond the side plates 6 and abut against the inner face of the track-laying element and constitute bearing means therefor. The balls of each set are arranged in spaced relation and permanently fixed with respect to each other by means of a cage or frame 18. A cage or frame 18 is employed for each set of balls. The cages maintain the balls spaced equi-distant, and allow the balls to revolve freely, thus preventing their cramming into the extremes or ends of the device when the latter is active. The webs or ribs 2 on the inner faces of the links 1 maintain the sets of balls in spaced relation as the balls 16 travel against one side of the webs and the balls 17 against the other side of the webs.

Having thus described our invention, what we claim as our invention and desire to protect by Letters Patent is set forth in the following claims:

1. A track-laying device comprising a pair of opposed, spaced plates, means for connecting the plates together and for maintaining them in spaced relation, a pair of opposed strips surrounding said means and forming ball races, two spaced sets of spaced bearing balls, each set positioned on a strip, a cage for each set of balls, and an endless, articulated track-laying element travelling on said sets of balls.

2. A track-laying device comprising a pair of opposed, spaced plates, means for connecting the plates together and for maintaining them in spaced relation, a pair of opposed strips surrounding said means and forming ball races, two spaced sets of spaced bearing balls, each set positioned on a strip, a cage for each set of balls, an endless articulated track-laying element travelling on said sets of balls, and means on the inner face of said element for separating said sets of balls.

3. A track-laying device comprising a pair of opposed, spaced plates, means for connecting the plates together and for maintaining them in spaced relation, means to provide a pair of ball races between said plates, two spaced sets of spaced bearing balls, each set associated with a race, a cage for each set of balls to maintain the balls of the set in spaced relation, said balls extending beyond said plates, and an endless, articulated track-laying element travelling on said sets of balls.

4. A track-laying device comprising a pair of opposed, spaced plates, means for connecting the plates together and for maintaining them in spaced relation, means to provide a pair of ball races between said plates, two spaced sets of spaced bearing balls, each set associated with a race, a cage for each set of balls to maintain the balls of the set in spaced relation, said balls extending beyond said plates, an endless, articulated track-laying element travelling on said sets of balls, and means on the inner face of said element and extending between said sets of balls for separating said sets relatively to each other.

In witness whereof we have signed the present specifications and claims, at Habana, the 11th of December, 1926.

ISAAC SANTOS y SUAREZ.
ANGEL ACOSTA y VELO.